CAMPING DEVICE

Filed Oct. 24, 1965 6 Sheets-Sheet 1

INVENTORS
Louise J. Yates
Harlan J. Yates
BY THEIR ATTORNEYS
Williamson & Palmatier Feb. 13, 1968 L. J. YATES ET AL 3,368,574

CAMPING DEVICE

Filed Oct. 24, 1965 6 Sheets-Sheet 2

INVENTORS
Louise J. Yates
Harlan J. Yates
BY THEIR ATTORNEYS
Williamson & Palmatier Feb. 13, 1968 L. J. YATES ET AL 3,368,574

CAMPING DEVICE

Filed Oct. 24, 1965 6 Sheets-Sheet 3

INVENTORS
Louise J. Yates
Harlan J. Yates
BY THEIR ATTORNEYS
Williamson & Palmatier

CAMPING DEVICE

Filed Oct. 24, 1965 6 Sheets-Sheet 4

INVENTORS
Louise J. Yates
Harlan J. Yates
BY THEIR ATTORNEYS
Williamson & Palmatier INVENTORS
Louise J. Yates
Harlan T. Yates
BY THEIR ATTORNEYS
Williamson & Palmatier

CAMPING DEVICE

INVENTORS
Louise J. Yates
Harlan T. Yates
BY THEIR ATTORNEYS
Williamson & Palmatier

United States Patent Office 3,368,574

Patented Feb. 13, 1968

3,368,574

CAMPING DEVICE

Louise J. Yates and Harlan J. Yates, both of 1946 Cedar Lake Blvd., Minneapolis, Minn. 55404

Filed Oct. 24, 1965, Ser. No. 504,484
8 Claims. (Cl. 135—1)

ABSTRACT OF THE DISCLOSURE

A camping device capable of being mounted on a car top by a conventional car top carrier, and including a body structure comprised of upper and lower sections formed of an insulating material. A screw and nut actuator for shifting the body sections vertically with respect to each other, and tubular guide means on the sections for guiding vertical movement thereof. Leg structures releasably engaging said upper section to support the body structure independently of the automobile.

This invention relates to a camping device and more specifically to a camping device which may be readily mounted and transported on a car top and which may be readily adjusted into an open and closed position.

An object of this invention is to provide a novel camping device which is adapted to be mounted on a car top to be transported thereby, and including a sectional body structure which may be readily opened or closed and when in the closed condition serving as a sealed insulated carrier, and when in the open condition serving as a camping kitchen and the like.

These and other objects and advantages of the invention will more fully appear from the following description made in connection with the accompanying drawings, wherein like character references refer to the same or similar parts throughout the several views, and in which.

Figure 1:
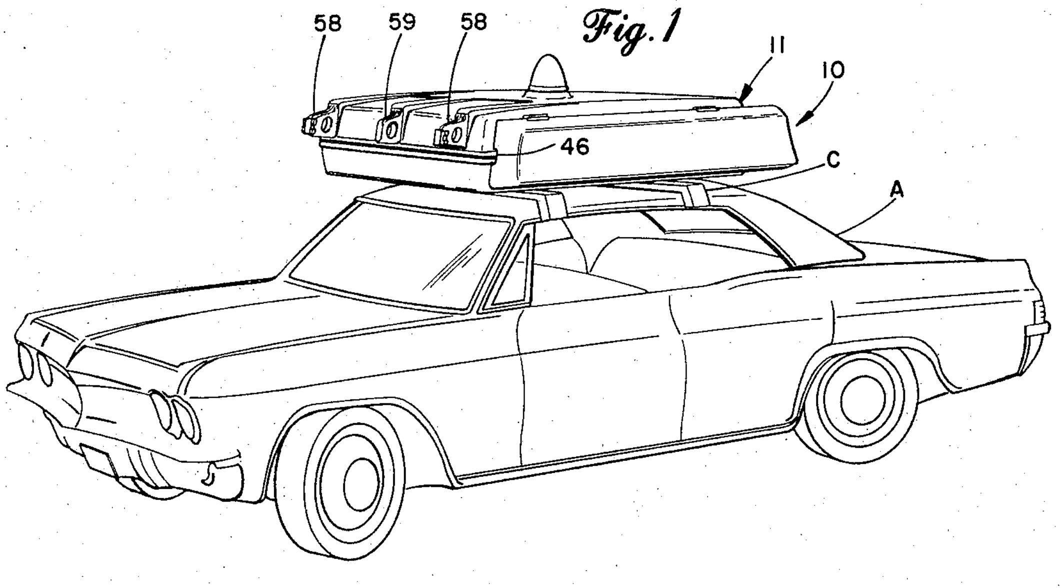
FIG. 1 is a perspective view of the camping device illustrated in closed transport position mounted on a conventional car top carrier carried by an automobile.
Figure 8:
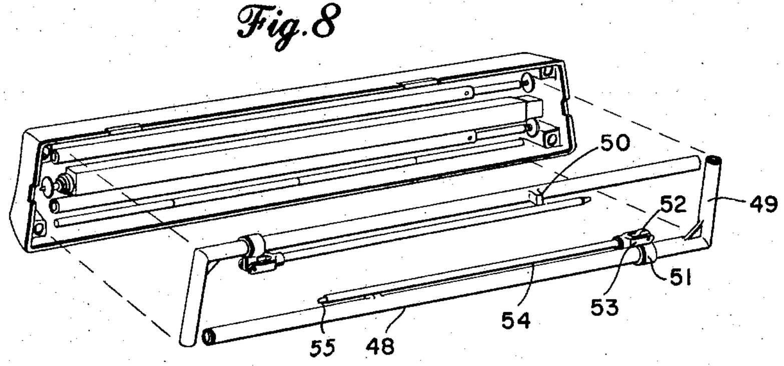
FIG. 8 is a perspective view on an enlarged scale of one of the leg storage compartments.

Referring now to the drawings and more specifically to FIGS. 1–5 it will be seen that one embodiment of the novel camping device designated generally by the reference numeral 10 is there shown. It will be seen that the camping device 10 is especially adapted for transport by conventional automobiles being supported by any commercial car top carrier C.

Figure 5:
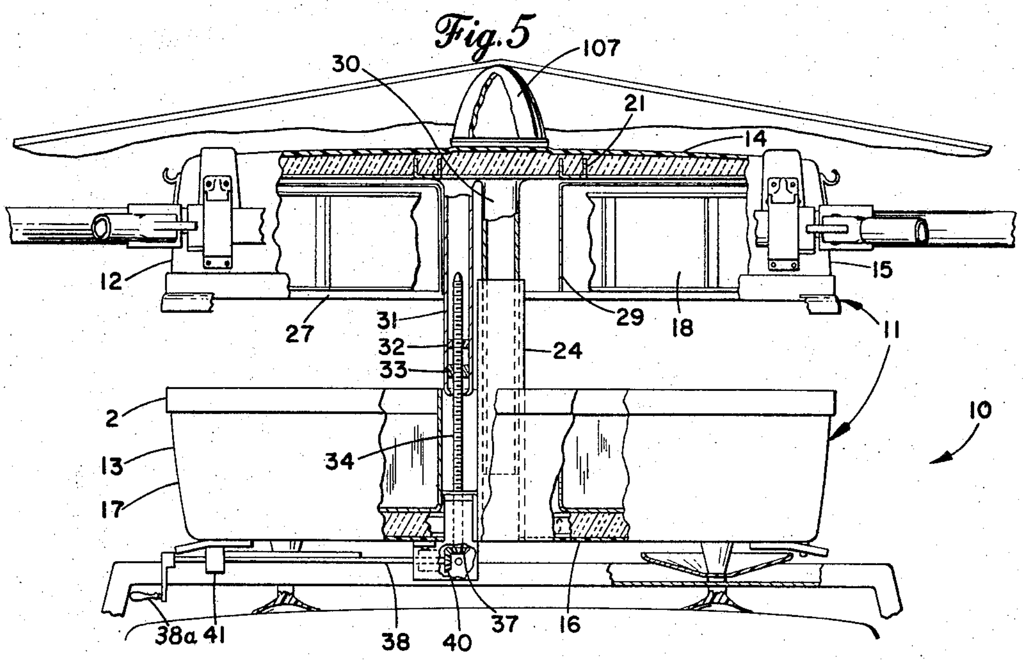
FIG. 5 is a side view on an enlarged scale partly in elevation and partly in section illustrating the sectional body structure in a partially open condition.

Referring now to FIG. 5 it will be seen that the camping device 10 includes a sectional hollow body structure 11 comprised of an upper section 12 and a lower section 13. The upper section 12 is comprised of a top wall 14 having downwardly extending continuous peripheral walls 15 integrally formed therewith. The bottom section 13 includes a bottom wall 16 having continuous upstanding peripheral walls 17 integrally formed therewith. It will be seen that the body structure 11 is of generally rectangular configuration so that the peripheral walls of the perspective sections actually constitute side walls and end walls.

Each of the sections includes an inner liner 18 of light weight metallic material such as aluminum and an outer skin 19 formed of a suitable plastic material such as fiber glass reinforced plastic and a light weight insulating core 20 also formed of a suitable plastic material having the desirable insulating properties. The core may be suitable reinforced with reinforcing frame members 21 which are also formed of a light weight material such as aluminum or the like.

Figure 13:
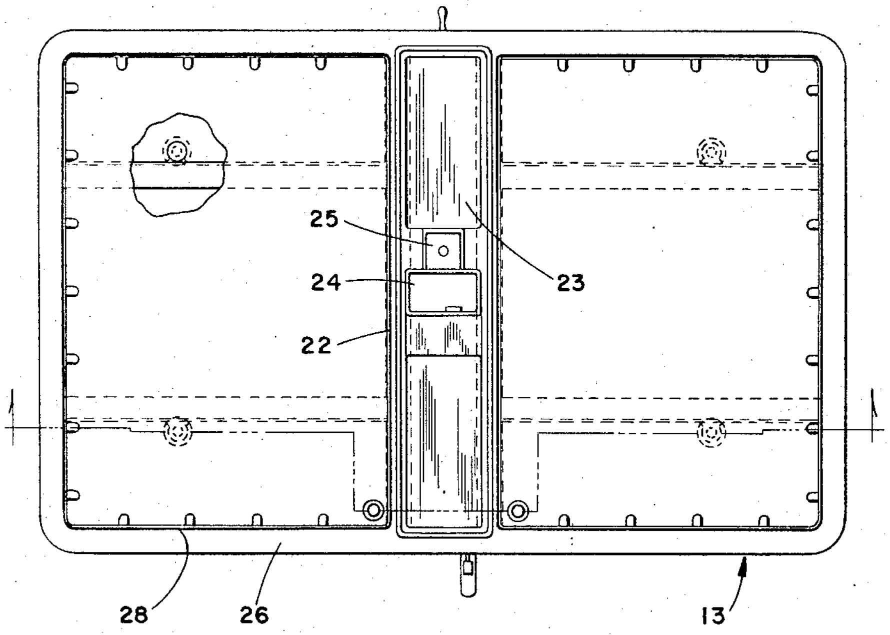
FIG. 13 is a top plan view of the lower section with parts thereof broken away for clarity.
Figure 14:
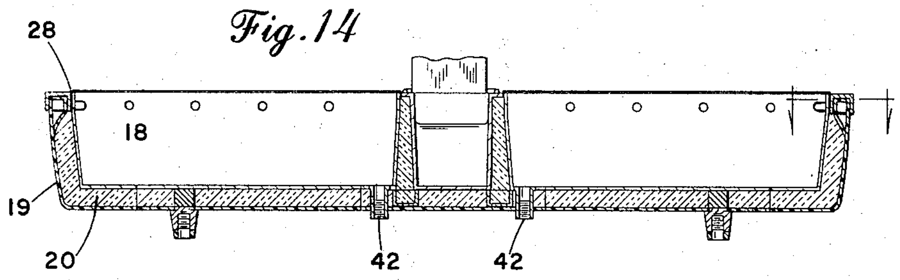
FIG. 14 is a longitudinal sectional view thereof taken approximately along the line 14—14 of FIG. 13 and looking in the direction of the arrows.

Referring now to FIGS. 5, 13 and 14 it will be seen that the lower section 13 has a transverse generally rectangular shaped compartment defining partition member 22 extending between and integrally formed with opposed peripheral wall portions. The exterior surfaces of this partition 22 is defined by the inner liner 18 of the lower section and this partition 22 is also provided with suitable insulation as best seen in FIG. 14. This partition structure also has a pair of upright opening recesses 23 therein that define compartments. A generally rectangular shaped centrally located hollow guide member 24 is integrally formed with a partition structure 22 and this guide member is preferably formed of a suitable aluminum material. Referring now to FIG. 5 it will be seen that the guide member 24 projects upwardly beyond the confines of the lower section 13. The partition structure 22 also has a substantially rectangular shaped recess 25 therein which extends downwardly from the upper surface thereof and which opens in an upper direction. It will be noted that the recess 25 is of generally rectangular configuration and is positioned slightly laterally of the guide member 24.

It will be noted that a lower section 13 has its upper peripheral edge defined by a continuous metallic extrusion preferably aluminum to present a substantially continuous flat surface thereat. Similarly, the upper section 12 also has a continuous generally channel shaped extrusion 27 which defines a lower continuous generally planar surface which engages the upper surface of the lower section 13. A suitable continuous sealing element 28 may be secured to the upper peripheral edge of the lower section 13 and a similar sealing element may also be provided for the upper section 12 to permit the interior of the sectional body structure to be sealed from the exterior.

It will also be noted that the upper section 12 is provided with a transversely extending generally rectangular shaped partition structure 29 which is of similar dimension and size to the partition structure 22 of the lower section 13. This partition structure 29 also has a centrally located recess therein and an elongate generally hollow guide member 30 of substantially rectangular cross-sectional shape is positioned in this centrally located recess and projects downwardly therefrom as best seen in FIG. 5. This guide member 30 is adapted to be received and slide in the guide member 24. The partition structure 29 also has an elongate tubular member 31 extending therethrough from the lower wall 14 and being positioned slightly laterally of the guide member 30. This tubular member 31 is of substantially rectangular cross-sectional shape and has a pressure plate 32 fixedly mounted therein in predetermined spaced relation from the open lower end thereof and also has a generally rectangular shaped internally nut 33 positioned between the open reduced lower end thereof and the pressure plate 32 and being vertically slidable therein. To this end it is pointed out that the nut 33 is normally urged towards the reduced lower end of the tube 31 by helical spring **34*a* but this nut is capable of limited vertical shifting movement between the reduced open end of the tube 31 and the fully compressed position of the helical spring 34*a***.

Figure 3:
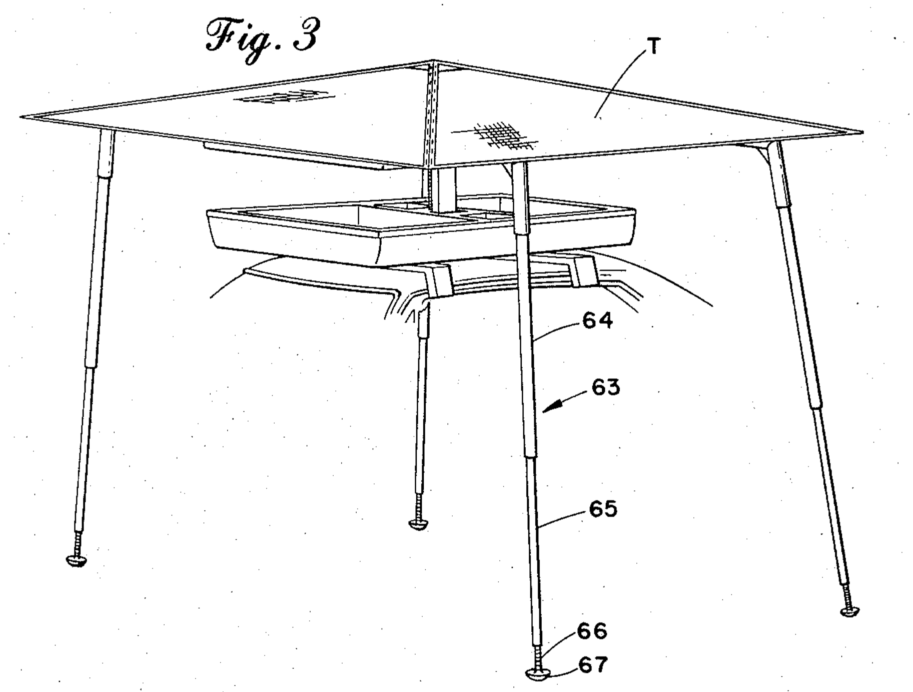
FIG. 3 is a perspective view similar to FIGS. 1 and 2 but illustrating the camping device in an open condition in one manner of use.
Figure 4:
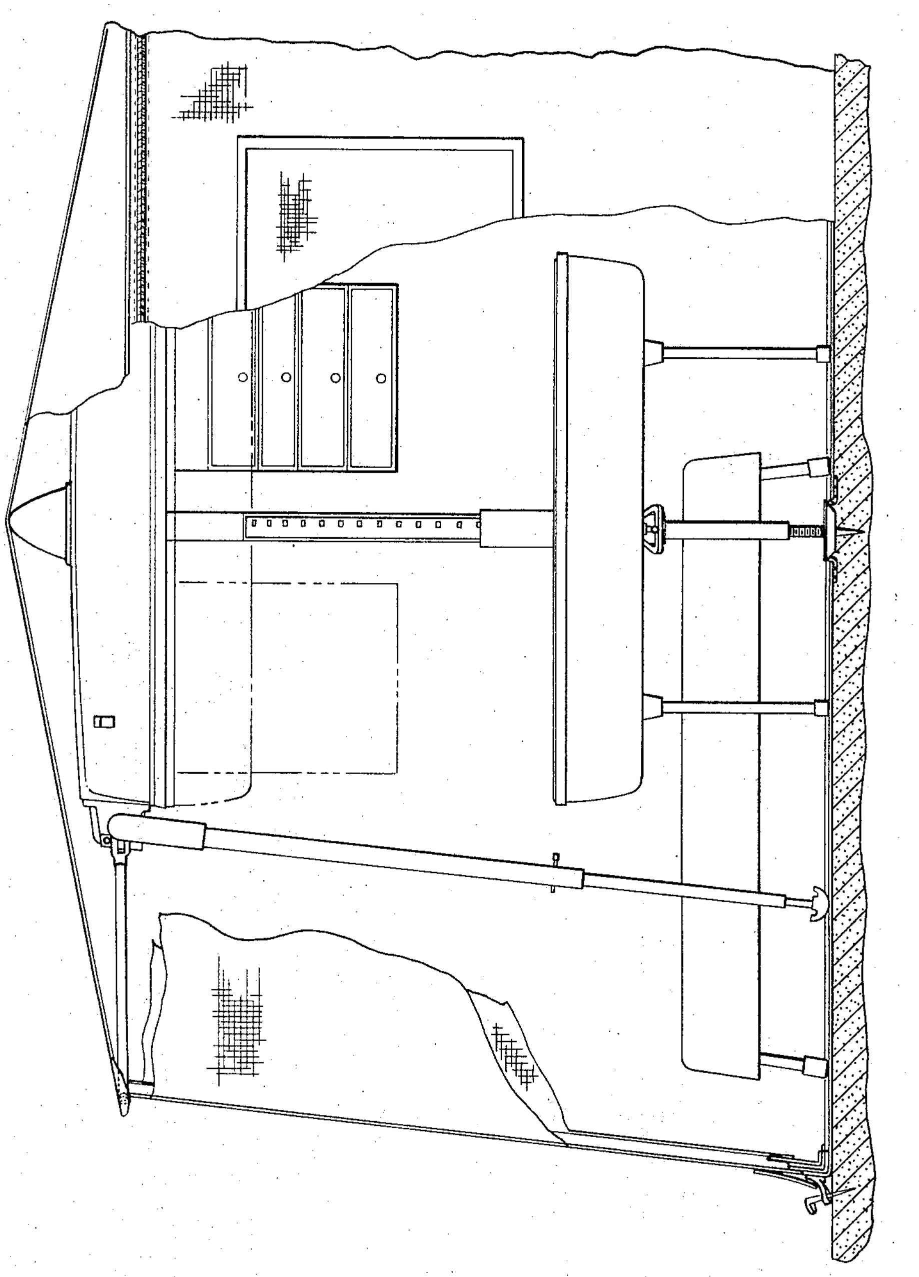
FIG. 4 is a side elevational view of the device in a complete open condition and illustrating another manner of use in cooperating relation with a tent structure.

The upper and lower sections are adapted to be moved between a completely closed position as illustrated in FIG. 1 to an open condition as illustrated in FIGS. 3, 4 and 5. The means for moving the upper and lower sections between open and closed positions comprises an elongate vertically projecting threaded actuator shaft 34 which projects upwardly through the recess 25 and which extends downwardly beyond the bottom wall 16 of the lower section 13. The pressure plate 32 has an opening therethrough and the actuator shaft is adapted to threadedly engage the nut 33 whereby upon rotation of the shaft 34, relative vertical translation may be produced with respect to the upper and lower sections.

Figure 15:
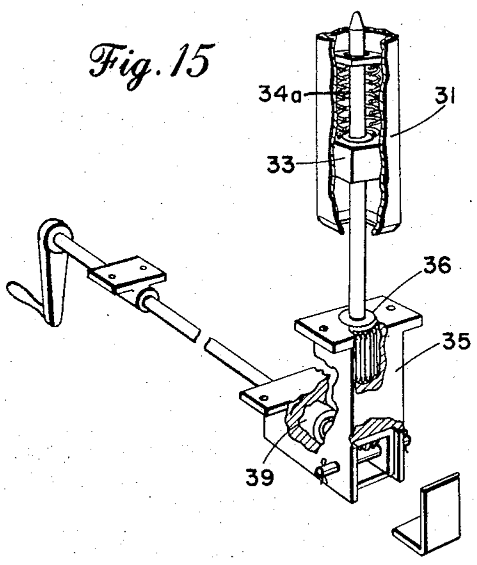
FIG. 15 is a perspective view of the elevating mechanism.

It will be seen that the lower end of the shaft projects into a generally L-shaped housing 35 carried by the lower wall of the lower section 13 and having a vertical bore therein through which the shaft 34 projects. A suitable needle bearing 36 journals the shaft for rotation about its axis in the housing 35 as best seen in FIGS. 5 and 15. The lower end of the shaft 34 has a beveled gear 37 keyed thereto for rotation therewith. A crank shaft 38 projects through a horizontal bore in the housing 35 and is journalled in a suitable bearing 39. The inner end of the shaft 38 having a beveled gear 40 keyed thereto which is disposed in meshing engagement with the gear 37. The crank shaft 38 is also supported by a bracket 41 secured to the bottom wall 16 of the lower section 13 and the outer end of the crank shaft 38 has a crank handle 42 affixed thereto facilitate rotation of the crank shaft. It will be seen that rotation in one direction of the crank shaft will produce vertical translation between the sections, the guide members 30 and 24 guiding said sections during said translatory movement. The yieldable spring 34 and slidable nut 33 permits some yielding, dampening movement between the sections during initial translation therebetween.

It is pointed out that the seal element as best seen in FIG. 13 may extend around the upper peripheral edges of the compartment defined by the central partition structure of both of the sections whereby when the sections are in the closed condition, each compartment will be sealingly separated from the other. With this arrangement, material such as foodstuffs or the like having wide thermal variances may be stored in a separate compartment because of the sealing insulation therebetween and there will be no heat exchange therebetween. It will also be seen that the lower section 13 has drain fittings or conduits 42 that extend downwardly through the lower or bottom wall 16 thereof to permit liquids to be drained therefrom. It is further pointed out that the guide member 24 of the lower section 13 also opens downwardly as well as upwardly, the purpose of which will be explained more fully hereinbelow. It will be seen that when the upper and lower sections are in the closed condition so that the edge surfaces of the peripheral walls engage each other, the guide members 24 and 30 will be disposed in telescoping relation and the threaded actuator shaft will extend substantially into the tube 31, the latter projecting downwardly into the recess 25 of the lower partition structure 22.

Figure 10:
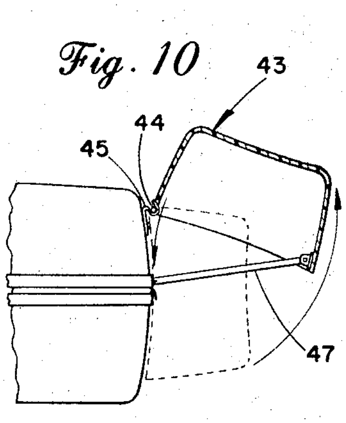
FIG. 10 is a fragmentary end elevational view illustrating the leg storage structure in an adjusted partially open condition.

Means are provided for permitting the sectional body structure to be supported by suitable ground-engaging leg means, the latter being applied to the body structure while the same is supported upon the car top carrier. To this end, it will be seen that a pair of generally elongate, substantially rectangular shaped leg storage structures 43 are provided and each has a pair of hinge pins 44 along one edge thereof, which engage hinge-engaging hooks 45 secured to the upper section 12 of the sectional body structure 11. Each of these leg storage structures 43 have recesses 46 formed in the ends thereof and these recesses are positioned around the extrusions 26 and 27 of the lower and upper section, thereby requiring the leg storage structures to be swung upwardly to the position illustrated in FIG. 10, or alternatively to be removed from the sectional body structure 11 if the body structure is to be shifted to the open position. Suitable positioning or retaining arms 47 are hingedly carried by the leg storage compartments as best seen in FIG. 10, to permit the leg storage compartments to be maintained in an outwardly swung position.

Figure 11:
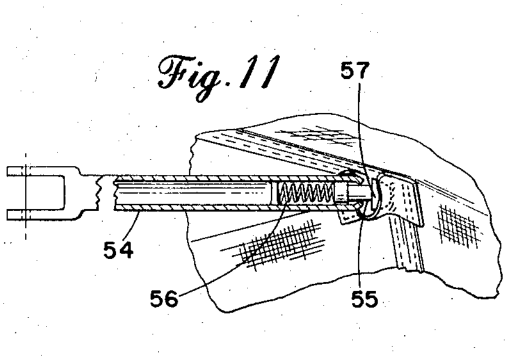
FIG. 11 is a fragmentary detail illustrating the tensioning means on the tent engaging arm.

As shown, the leg storage compartment is adapted to contain a plurality of supporting legs, and referring now to FIGS. 2, 3, 4, 5, 8, 9 and 12, it will be seen that the leg supporting structure includes a pair of elongate, L-shaped, generally tubular outrigger type leg members 48, each having a leg attachment portion 49 formed therewith and disposed at right angles thereto. Each of these outrigger leg members 48 has a locking lug 50 formed therewith and projecting outwardly therefrom. Each outrigger leg member also has a sleeve bracket 51 revolvably and slidably mounted thereon, the latter having an ear 52 projecting outwardly therefrom, to which the bifurcated end 53 of an elongate tensioning arm 54 is pivotally connected by pivot pin. It will be seen that the other end of the tensioning arm 54 has a plunger element 55 telescopically received therein, the plunger element being normally urged outwardly by helical spring 56. It will be noted that the plunger element has an enlarged, generally arcuate head 57 which is adapted to be positioned within a canvas pocket of a conventional tent or canopy structure T, as best seen in FIG. 11. Two outrigger leg members are associated with each end of the sectional body structure 11 when the latter is supported by the leg structures upon the ground. The upper section 12 of the sectional body structure 11 has a pair of end brackets 58 and a center bracket 59 affixed to each end thereof, these brackets having substantially cylindrical openings therethrough disposed in substantially registering relation to receive the outrigger leg members therethrough.

Figure 9:
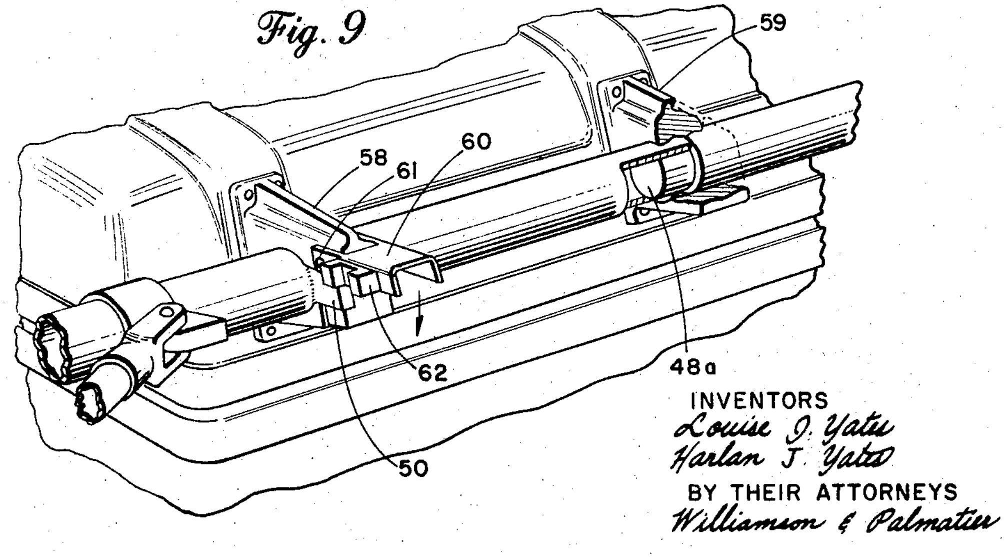
FIG. 9 is a perspective view on an enlarged scale illustrating the manner in which the leg structures are mounted on the sectional body structure.
Figure 2:
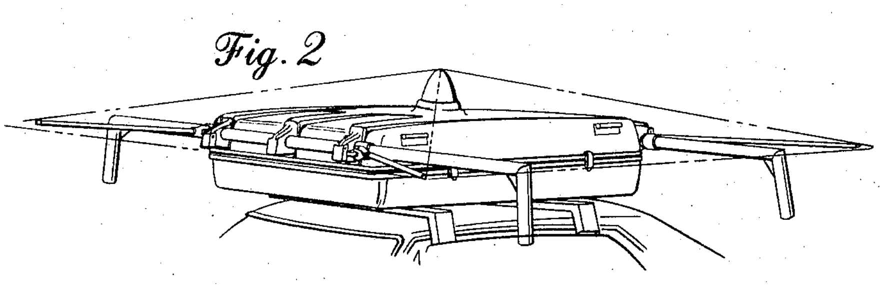
FIG. 2 is a view similar to FIG. 1 but illustrating the camping device in the initial stage of being shifted to the open position.

Referring now to FIG. 9, it will be seen that each outrigger member is positioned so that the end thereof is received within the center bracket 59, one outrigger leg member having a reduced end **48*a* which is telescopically received within the open end of the other outrigger leg member. The end brackets 58 have outwardly opening slots therein to communicate with the cylindrical opening therethrough to permit the locking lug 50 to be accommodated therein. Each of the end brackets 58 has a generally channel shape latch plate 60 pivotally mounted thereon by pivot 61 which is swung between latched and unlatched condition. It will be seen that the L-shaped latch plate 60 is in the open condition as illustrated in FIG. 9. This latch plate is adapted to be swung downwardly so that the legs of the latch plate are positioned around or embrace the locking lug 50. It will also be seen that each latch plate has a generally U-shaped lock member 62 secured to one leg thereof and this lock member is engageable with the ear 52 of the sleeve bracket 51 when the latch plate 60** is in the locked condition to latch the tensioning arm so that the latter is horizontally oriented with respect to the surface of the ground.

The leg attachment 49 of each outrigger leg member is adapted to receive the upper leg element 64 of the telescopic sectional leg member 63 therein. It will be seen that each leg member 63 also includes an intermediate leg member 65 which has one end thereof telescopically slidably received within the tubular leg element 64, the floor end of leg element 65 being threaded to receive the lower threaded element 66 therein. A suitable foot element 67 is secured to the lower terminal end of the threaded leg element 66, as clearly seen in FIG. 12. It will be seen that the upper and intermediate leg elements are provided with suitable apertures therein, and a latch pin 68 is insertable into a pair of such registering apertures, the latter being provided with a locking clip 69 to prevent accidental disengagement of the pin from the apertures.

Figures 16, 17, 18, 19:
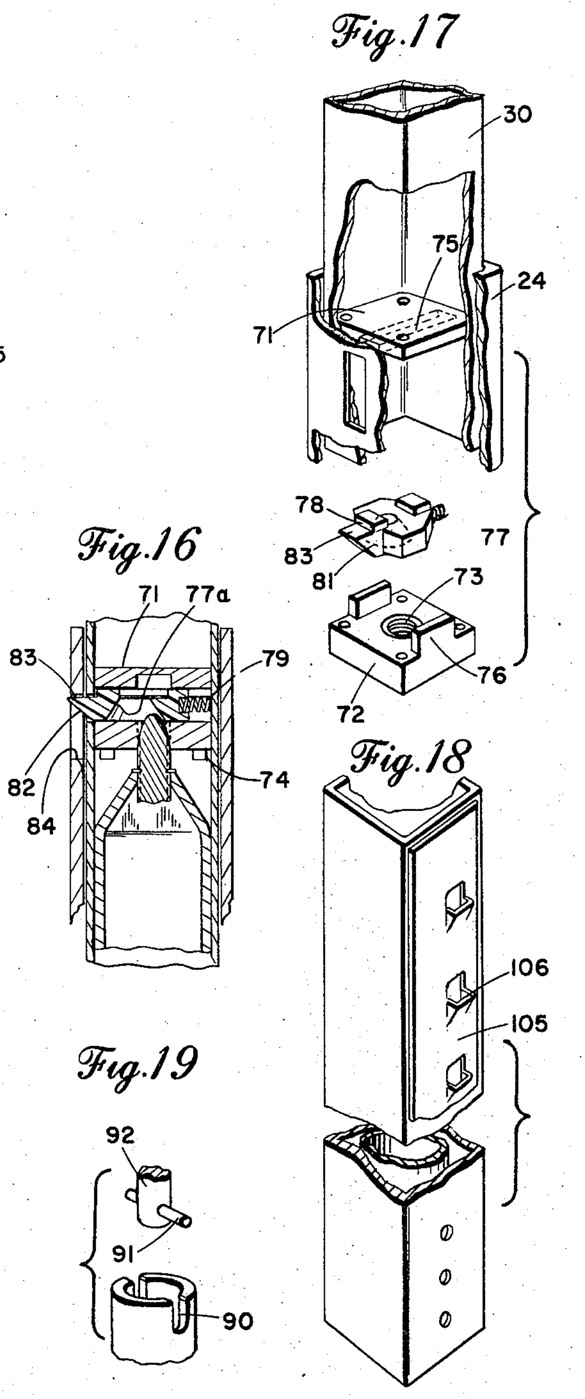
FIG. 16 is a fragmentary cross-sectional view illustrating a latch means associated with the guide means of the upper and lower sections.
FIG. 17 is an exploded perspective view of the latch means illustrated in FIG. 16 with certain parts thereof broken away for clarity.
FIG. 18 is a fragmentary perspective view of the center support structure.
FIG. 19 is a perspective view illustrating a detail of construction of the center post support structure.

Although the leg members 63 provide support along with the outrigger leg members, for the sectional body structure 11, a center post supporting structure designated generally by the reference number 70 is also provided. Referring now to FIGS. 4, 6, 8, 16, 17 and 18, it will be seen that the center post structure projects upwardly into the guide member 24 of the lower section 13 when this center post structure is in supporting relation along with the leg members 63, with the sectional body structure. Reference however is first made to FIG. 17 wherein it will be seen that the guide member 30 carried by the uppper section 12 has a plate 71 fixedly mounted therein. A generally rectangular shaped block 72 having a threaded bore 73 therein is secured to the plate 71 by suitable bolts 74 which pass through suitable apertures in block 72 and engage in threaded apertures into plate 71. It will be seen that plate 71 has tranverse slot 75 in the lower surface thereof and it will also be seen that the block 72 has a pair of vertically projecting spacer elements 76 integrally formed therewith whereby the block 72 is spaced vertically from the plate 71 when the latter are interconnected. The latch member 77 having a pair of guide elements 78 is positioned between the plate 71 and the block 72, the guide elements 78 being disposed within the slot 75 of the plate 71 whereby the latch member is capable of sliding movement in a lateral direction. A small helical spring 79 normally urges outwardly through an opening in the guide member 30 so that the element 81 projects outwardly therefrom. It will be seen that the latch 81 includes a beveled lower surface 82 and a substantially flat upper surface 83. The latch element 81 is adapted to project through an opening 84 formed in the guide member 24 when the latch element and opening are aligned with respect to each other. This condition occurs when the nut 33 is located at approximately the upper end of the threaded actuator 34. It will therefore be seen that the guide members 24 and 30 will then be locked with respect to each other against further telescoping movement in a direction that would produce additional opening or separation of the upper and lower section, unless the locking means is released from its locked condition.

Referring again to FIGS. 6, 16, 17 and 18, it will be seen that the center post structure 70 is of a size to fit snugly within the guide member 24 and is adapted to abut the lower edge of the guide member 30 carried by the upper section 12. An elongate tubular member 85 is telescopically positioned within the lower end of the center post 70 and projects downwardly thereof, the lower end of which is internally threaded for receiving the threaded extension 86, the latter having a foot element 87 secured thereto. It will be seen that the foot element has a ground-piercing member 88 integrally formed therewith and projecting downwardly therefrom whereby the foot element may be supported upon the surface of the ground while the ground piercing member is inserted into the ground. It will be seen that the tubular member 85 as well as the center post 70 has a plurality of apertures therein and a locking pin 89 is adapted to be inserted in the pair of registering apertures to lock the center post structure in an adjusted position relative to the tubular member 85. The extension 86 permits a fine vertical adjustment of the center post structure.

Referring now to FIG. 19, it will be seen that the upper end of the tubular member 85 has a pair of aligned, vertically extending slots 90 therein which receive the ends of a transverse pin 91 carried by the lower end of an elongate shaft 92. This shaft 92, which is threaded at its upper end is revolvably mounted within a sleeve 93 which is fixedly mounted within the upper end of the center post 70. It will be noted that the sleeve 93 projects upwardly beyond the end of the center post and that the shaft 92 projects upwardly beyond the end of the sleeve 93. Suitable retaining rings are provided for preventing axial movement of the shaft 92 and it will be seen that when the transverse pins 91 are disposed in the slots 90, the shaft may be rotated upon rotation of the tubular member 85. The upper threaded end of the shaft 92 is of bullet or conical configuration and is adapted to threadedly engage the threaded bore 73 of the block 72 and when the tubular member 85 is revolved, the upper end of the threaded shaft 92 may be moved through the bore 73 to engage the conical recess **77*a* in the latch member 77. When this occurs, the latch member 77 may be cammed out of latching engagement with respect to the guide member 30 and against the bias of the spring 79. The sectional body structure 11 may then be adjusted relative to the center post 70**.

Figures 6, 7, 12:
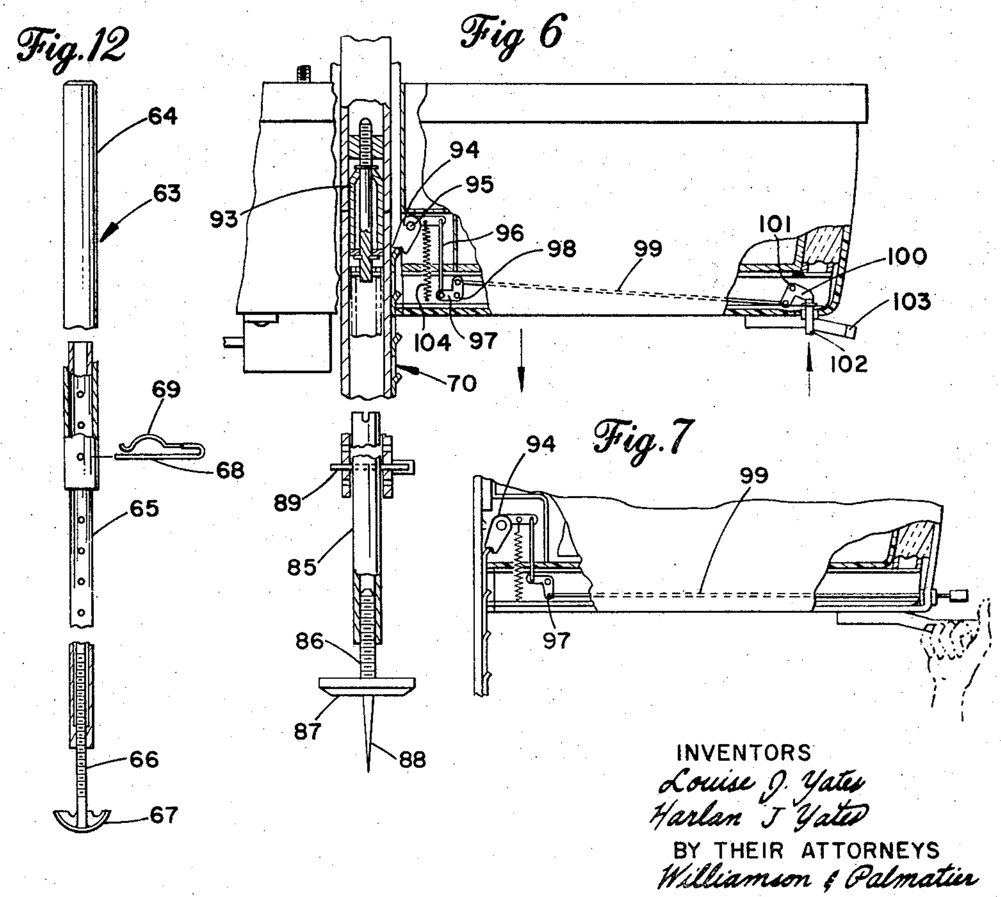
FIG. 6 is a fragmentary detail view illustrating one embodiment of the lock mechanism for locking the body section in an adjusted position.
FIG. 7 is a fragmentary view similar to FIG. 6 illustrating a modified form of the lock mechanism.
FIG. 12 is a side view partly in section and partly in elevation of a leg member and lock means associated therewith.

Means are also provided for releasably interlocking the lower section 13 and the center post 70 and this means comprising a locking dog 94 pivotally mounted by pivot pin 95 on the lower section 13, as best seen in FIG. 6. The guide member 24 has an opening or recess therein and this locking dog 94 is swingable through the recess for locking engagement with the center post 70. The locking dog 94 is of bell crank configuration and vertical link 96 is pivotally connected to one end of one of the arms of the locking dog 94 and the other end of the link 96 is pivotally connected to one arm of the bell crank 97 which is also pivotally mounted by pivot 98 to the lower section 13. Elongate thrust rod 99 is pivotally connected to the other arm of the bell crank 97 and this thrust rod is pivotally connected to one end of the bell crank 100 which is pivotally mounted on a pivot 101, also carried by the lower section 13. A vertically shiftable actuator member 102 engages the bell crank 100 whereby upon vertical movement of the actuator 102, the bell crank 100 will be caused to swing about its pivot. Handle 103 is connected to the actuator member 102 to facilitate movement thereof. A coil spring 104 engages the locking dog 94 to normally urge the same about its pivot in a direction inwardly towards the post 70.

Referring again to FIG. 6, as well as FIG. 18, it will be seen that the center post 70 has a locking strip 105 rigidly secured thereto, the latter having a plurality of outwardly struck lock-engaging elements 106 which are arranged in vertical alignment. It will be seen that this arrangement, as the lower section is allowed to slide downwardly along the center post 70, the locking dog 94 will be urged into engagement with the uppermost of the locking elements 106. In order to permit further downward adjustment of the lower section 13, it is then necessary to lift slightly upwardly on the lower section and simultaneously urge the handle 103 upwardly to disengage or retract the locking dog and allow the lower section to be moved downwardly.

Referring now to FIG. 7, it will be seen that a different embodiment of the locking means is shown, the latch dog 94 being of identical construction as well as the bell crank 97, a thrust rod 99 is provided but merely projects outwardly beyond one of the peripheral walls of the lower section so that upon inward movement of the thrust rod 99, the bell crank 97 will be pivoted to move the locking dog 94 out of engagement relation with respect to one of the latch elements 106. It will be seen that to provide this arrangement, it is merely necessary to reorient the bell crank 97 and to extend the thrust rod 99 exteriorly of the peripheral wall of the lower section 13. It will also be seen that a suitable incandescent lamp 107 may be provided, which is mounted on the top wall of the upper section 12 of the sectional body structure.

In setting up the camping device, the leg storage structures 43 will be swung upwardly and the outrigger leg members as well as the leg members, and the center post structure will be removed therefrom. The leg storage structure is then retained in its upwardly swung position or removed from supported relation with respect to the hinge hooks 45. The crank shaft 38 is rotated which produces vertical translation of the upper section 12 to the desired height. It is pointed out that as the nut approaches the upper end of the threaded shaft 34, the latch element 81 will be moved into locking relation with the opening 84 and the guide member 24. The outrigger leg members may then be positioned in place and the leg members may be inserted into the leg attachment portions of the outrigger leg members. The crank shaft 38 may be oppositely revolved to raise the lower section relative to the upper section whereby the automobile A may be removed from supporting relation with respect to the sectional body structure 11.

The center post structure may then be inserted into guide member 24, and the tubular member 85 may be rotated prior to interlocking the same with the center post 70. By revolving the tubular member 85, the shaft 92 may be moved in axial direction to disengage the latch element 81 from locked relation with respect to the guide member 84 in the event the latch element is in this interlocked condition. The upper and lower sections may then be adjusted along the center post to the desired degree by manipulating the means that control the locking dog 94. A tent arrangement may be used in conjunction with the camping device, as illustrated in FIG. 4, and it is pointed out that the leg storage structures 43 may be inverted and leg elements secured thereto to thereby serve as benches. In some instances, it is desirable to use a canopy type tent T as shown in FIGS. 2, 3, 4, 5 and 11. When a tent or a tent canopy is used, the tensioning arms 54 may be inserted in the pockets of the tent or canopy.

It is pointed out that the camping device may be used as a portable kitchen. When in the open condition, it may be used to transport perishable foodstuffs in a refrigerated condition because of its insulated construction. Similarly, heated foods may be maintained in their heated condition in the sectional body device.

The device may also be used as a central work area for outdoor crafts and the like.

From the foregoing description it will be seen that we have provided a novel and improved camping device which is not only of simple and inexpensive construction but one which functions in a more efficient manner than any heretofore comparable device.

We claim:

1. An insulated camping device adapted to be mounted and supported by a conventional car top carrier on the top of an automobile or the like to be transported thereby, said device comprising a sectional hollow body structure comprised of an upper section having a top wall and a depending continuous peripheral wall integrally formed therewith, and a lower section having a bottom wall and an upstanding continuous peripheral wall, drive means interconnecting said sections together and being operable to produce vertical translation of one of said sections relative to the other to shift the same between closed and opened positions, said sections when in the closed position having the opposed peripheral surfaces of the peripheral walls thereof disposed in abutting engaging relation, and when in open position being vertically spaced apart, said lower section being shifted downwardly to the open position and during said shifting movement being suspended from and supported solely by said upper section, cooperating guide means on said sections to permit vertical translation only of said sections during shifting movement thereof, extensible and retractable leg supporting structure interconnected with said upper section and serving to support the entire body structure above the carrier vehicle and independently of the latter to permit the carrier vehicle to be driven from therebeneath, and means on said sections for releasably retaining the same in said closed position and in a selected open position.

2. A camping device as defined in claim 1 wherein said extensible and retractable leg supporting structure comprises a plurality of elongate transversely extending outrigger members, releasable means on said upper section for releasably retaining said outrigger members thereon in substantially horizontal relationship with respect to the surface of the ground, and elongate leg members releasably interconnected with the one end of said outrigger members and depending therefrom.

3. The camping device as defined in claim 1 wherein said drive means comprises an elongate threaded shaft revolvably mounted on one of said sections, and a shaft engaging nut mounted on the other of said sections, and actuator means projecting exteriorly of said sections to facilitate relative rotation between said threaded shaft and shaft engaging nut.

4. A camping device as defined in claim 1 wherein said guide means comprises a pair of vertically oriented telescoping posts, one of which is fixedly connected to one of said sections and the other of said posts being fixedly connected to the other of said sections.

5. A camping device as defined in claim 4 and a centrally located center post member having one end thereof insertable into the guide member on said lower section and being extensible and retractable relative thereto, and cooperating locking means on said lower section and said center post member to permit said sections to be adjustably mounted thereon in one of a plurality of vertically selected positions.

6. A camping device as defined in claim 1 wherein each of said sections is of double wall construction including an outer skin and an inner liner and an insulating core therebetween.

7. A camping device as defined in claim 6 wherein each of said sections is provided with a transversely extending partition structure dividing the interior thereof into two separate compartments, and sealing means on said respective sections for sealing the compartments of the interior of the body structure from each other and from the exterior when the sections are in closed position.

8. The camping device as defined in claim 3 wherein said nut is shiftably mounted in an elongate tubular member affixed to said one section, and being vertically shiftable relative to said tubular member, resilient means yieldably resisting vertical shifting movement of said nut in one direction.

References Cited

UNITED STATES PATENTS

| | | | |
|---|---|---|---|
| 2,561,921 | 7/1951 | Guillot | 296—23.3 |
| 2,710,977 | 6/1955 | Fannin | 135—1 |
| 2,729,497 | 1/1956 | Runyan | 296—23 |
| 2,767,013 | 10/1956 | Spears | 296—23.3 X |
| 3,111,955 | 11/1963 | Green | 135—1 |
| 3,179,462 | 4/1965 | Hagen | 296—23 |
| 3,288,521 | 11/1966 | Patnode | 296—23 |

DAVID J. WILLIAMOWSKY, *Primary Examiner.*

PETER M. CAUN, *Examiner.*